US012502454B2

(12) United States Patent
Parsons et al.

(10) Patent No.: US 12,502,454 B2
(45) Date of Patent: Dec. 23, 2025

(54) WOUND DRESSING COMPRISING AN ANTIMICROBIAL COMPOSITION

(71) Applicant: ConvaTec Technologies Inc., Las Vegas, NV (US)

(72) Inventors: David Parsons, Wirral (GB); Christopher Ledger, Cheshire (GB)

(73) Assignee: CONVATEC TECHNOLOGIES INC., Las Vegas, NV (US)

( * ) Notice: Subject to any disclaimer, the term of this patent is extended or adjusted under 35 U.S.C. 154(b) by 0 days.

(21) Appl. No.: 17/722,986

(22) Filed: Apr. 18, 2022

(65) Prior Publication Data

US 2022/0233741 A1 Jul. 28, 2022

Related U.S. Application Data

(62) Division of application No. 14/889,818, filed as application No. PCT/US2014/038224 on May 15, 2014, now abandoned.

(30) Foreign Application Priority Data

May 15, 2013 (GB) ..................................... 1308770

(51) Int. Cl.
*A61L 15/18* (2006.01)
*A61L 15/20* (2006.01)
*A61L 15/28* (2006.01)
*A61L 15/44* (2006.01)
*A61L 15/46* (2006.01)

(52) U.S. Cl.
CPC ............... *A61L 15/20* (2013.01); *A61L 15/18* (2013.01); *A61L 15/28* (2013.01); *A61L 15/44* (2013.01); *A61L 15/46* (2013.01); *A61L 2300/102* (2013.01); *A61L 2300/104* (2013.01); *A61L 2300/208* (2013.01); *A61L 2300/404* (2013.01)

(58) Field of Classification Search
None
See application file for complete search history.

(56) References Cited

U.S. PATENT DOCUMENTS 2,396,514 A 3/1946 Kreidl et al.
2,785,106 A 3/1957 Mendelsohn
3,061,469 A 10/1962 Manowitz et al.
3,092,552 A 6/1963 Romans
4,258,056 A 3/1981 Lentsch
4,612,337 A 9/1986 Fox, Jr. et al.
4,655,758 A 4/1987 Ring et al.
4,728,323 A 3/1988 Matson
4,829,129 A 5/1989 Kelley
4,889,654 A 12/1989 Mason et al.
4,906,100 A 3/1990 Rice et al.
4,973,848 A 11/1990 Kolobanov et al.
5,064,652 A 11/1991 Bay
5,326,567 A 7/1994 Capelli
5,340,924 A 8/1994 Tomita et al.
5,407,656 A 4/1995 Roozdar
5,527,534 A 6/1996 Myhling
5,567,495 A 10/1996 Modak et al.
5,616,347 A 4/1997 Alliger et al.
5,662,913 A 9/1997 Capelli
5,709,870 A 1/1998 Yoshimura et al.
5,731,083 A 3/1998 Bahia et al.
5,744,151 A 4/1998 Capelli
5,744,155 A 4/1998 Friedman et al.
5,762,620 A 6/1998 Cartmell et al.
5,820,918 A 10/1998 Ronan et al.
5,848,995 A 12/1998 Walder
5,860,947 A 1/1999 Stamler
5,998,488 A 12/1999 Shinohara et al.
6,075,177 A * 6/2000 Bahia .................. A61L 26/0023 602/41
6,207,601 B1 3/2001 Maurer et al.
6,290,496 B1 9/2001 Azar et al.
6,413,556 B1 7/2002 Bathurst et al.
6,468,965 B1 10/2002 Cutler
6,548,730 B1 4/2003 Patel et al.
6,555,508 B1 4/2003 Paul et al.
6,605,751 B1 8/2003 Gibbins et al.
6,669,981 B2 12/2003 Parsons et al.
6,750,262 B1 6/2004 Haehnle et al.
6,753,063 B1 6/2004 Pung et al.
7,033,511 B2 4/2006 Zawada et al.
7,267,828 B2 9/2007 Parsons et al.
8,637,072 B2 1/2014 Kershaw et al.
9,149,035 B2 10/2015 Percival et al.

(Continued)

FOREIGN PATENT DOCUMENTS

CN 101076251 A 11/2007
CN 101331263 A 12/2008

(Continued)

OTHER PUBLICATIONS

Australian Patent Application No. 2017201084 Examination Report No. 1 dated May 18, 2018.
European Patent Application No. 09795521.5 Office Action dated May 9, 2018.
Russian Patent Application 2015153446 Office Action and Search Report dated Apr. 23, 2018.
Waring et al. Physico-chemical characterisation of carboxymethylated spun cellulose fibres. Biomaterials 22:903-912 (2001).
Charkevich, D.A., Pharmacology:Textbook. Geotar-Media, p. 66-71, 2006. (No copy was provided by the foreign associate).
India Patent Application No. 9392/DELNP/2013 First Examination Report dated Feb. 23, 2018.
Japanese Patent Application No. 2017-112806 Office Action dated Mar. 6, 2018.
Japanese Patent Application No. 2016-202835 Office Action dated Mar. 6, 2018.

(Continued)

*Primary Examiner* — Jake M Vu
(74) *Attorney, Agent, or Firm* — TAFT STETTINIUS HOLLISTER LLP; Ryan O. White; Derek B. Lavender

(57) ABSTRACT

Methods, processes and compositions are provided for improved wound dressings comprising an antimicrobial composition. The wound dressings maintain conformability and strength, as well as antimicrobial performance, upon use after storage.

3 Claims, No Drawings

(56) References Cited

U.S. PATENT DOCUMENTS

| | | | |
|---|---|---|---|
| 9,545,390 B2 | 1/2017 | Percival et al. | |
| 11,318,223 B2 | 5/2022 | Wibaux | |
| 11,351,286 B2 | 6/2022 | Thompson, Jr. et al. | |
| 2002/0091074 A1 | 7/2002 | Wooley et al. | |
| 2002/0160941 A1 | 10/2002 | Kruzel | |
| 2002/0172709 A1 | 11/2002 | Nielsen et al. | |
| 2003/0180345 A1 | 9/2003 | Hill et al. | |
| 2003/0180346 A1 | 9/2003 | Woods | |
| 2004/0001880 A1 | 1/2004 | Bowler et al. | |
| 2004/0247652 A1 | 12/2004 | Sabesan | |
| 2006/0019571 A1 | 1/2006 | Lange et al. | |
| 2006/0051385 A1 | 3/2006 | Scholz | |
| 2006/0051430 A1 | 3/2006 | Arata et al. | |
| 2006/0115440 A1 | 6/2006 | Arata et al. | |
| 2006/0234959 A1 | 10/2006 | Biel et al. | |
| 2006/0254988 A1 | 11/2006 | Frampton | |
| 2007/0042024 A1 | 2/2007 | Gladman et al. | |
| 2007/0134136 A1 | 6/2007 | Polyakov et al. | |
| 2007/0166399 A1 | 7/2007 | Burton et al. | |
| 2007/0255192 A1 | 11/2007 | Patel et al. | |
| 2008/0112920 A1 | 5/2008 | Shen et al. | |
| 2008/0226724 A1 | 9/2008 | Ji et al. | |
| 2009/0012440 A1 | 1/2009 | Bray et al. | |
| 2009/0177135 A1 | 7/2009 | Rogers et al. | |
| 2010/0015208 A1 | 1/2010 | Kershaw et al. | |
| 2010/0113537 A1* | 5/2010 | Nonaka | D06M 11/56 514/358 |
| 2010/0129633 A1 | 5/2010 | Law | |
| 2010/0310845 A1 | 12/2010 | Bond et al. | |
| 2011/0237994 A1 | 9/2011 | Russ et al. | |
| 2012/0202398 A1 | 8/2012 | Marshall et al. | |
| 2013/0150451 A1 | 6/2013 | Salamone et al. | |
| 2014/0276493 A1* | 9/2014 | Leung | A61L 15/46 424/641 |
| 2017/0079276 A1 | 3/2017 | Percival et al. | |
| 2022/0233741 A1 | 7/2022 | Parsons et al. | |
| 2024/0009372 A1 | 1/2024 | Braga et al. | |

FOREIGN PATENT DOCUMENTS

| | | | |
|---|---|---|---|
| CN | 105407930 | A | 3/2016 |
| EP | 0616650 | A1 | 9/1994 |
| EP | 0680344 | A1 | 11/1995 |
| EP | 1158859 | A1 | 12/2001 |
| EP | 1318842 | A1 | 6/2003 |
| EP | 1343510 | A1 | 9/2003 |
| EP | 1425050 | A1 | 6/2004 |
| EP | 1557088 | A1 | 7/2005 |
| EP | 1882482 | A2 | 1/2007 |
| EP | 1925719 | A1 | 5/2008 |
| EP | 1925917 | A1 | 5/2008 |
| EP | 1343510 | B1 | 5/2010 |
| EP | 2262545 | A2 | 12/2010 |
| EP | 2996730 | A1 | 3/2016 |
| EP | 3241439 | A1 | 11/2017 |
| EP | 3060264 | B1 | 4/2022 |
| FR | 2604900 | A1 | 4/1988 |
| GB | 735462 | A | 8/1955 |
| GB | 1105829 | A | 3/1968 |
| GB | 2094802 | A | 9/1982 |
| GB | 2220881 | A | 1/1990 |
| JP | S5138427 | A | 3/1976 |
| JP | H07502081 | A | 3/1995 |
| JP | H08505790 | A | 6/1996 |
| JP | 2000510539 | A | 8/2000 |
| JP | 2002539140 | A | 11/2002 |
| JP | 2003052725 | A | 2/2003 |
| JP | 2003510475 | A | 3/2003 |
| JP | 2003512095 | A | 4/2003 |
| JP | 2003531828 | A | 10/2003 |
| JP | 2007509034 | A | 4/2007 |
| JP | 2007167266 | A | 7/2007 |
| JP | 2007532606 | A | 11/2007 |
| JP | 2008502735 | A | 1/2008 |
| JP | 2008038293 | A | 2/2008 |
| JP | 2008503557 | A | 2/2008 |
| JP | 2008507327 | A | 3/2008 |
| JP | 2008526997 | A | 7/2008 |
| JP | 2009519312 | A | 5/2009 |
| JP | 2016040294 | A | 3/2016 |
| JP | 2016519966 | A | 7/2016 |
| RU | 2092180 | C1 | 10/1997 |
| WO | 8401721 | A1 | 5/1984 |
| WO | 9218098 | A1 | 10/1992 |
| WO | 9312275 | A1 | 6/1993 |
| WO | 9319152 | A1 | 9/1993 |
| WO | 9402022 | A1 | 2/1994 |
| WO | 9416746 | A1 | 8/1994 |
| WO | 9601119 | A1 | 1/1996 |
| WO | 9702313 | A1 | 1/1997 |
| WO | 9806260 | A1 | 2/1998 |
| WO | 9846818 | A1 | 10/1998 |
| WO | 0054593 | A1 | 9/2000 |
| WO | 0072874 | A1 | 12/2000 |
| WO | 0123653 | A1 | 4/2001 |
| WO | 0124839 | A1 | 4/2001 |
| WO | 0128338 | A2 | 4/2001 |
| WO | 0128600 | A1 | 4/2001 |
| WO | 0137936 | A1 | 5/2001 |
| WO | 0162289 | A2 | 8/2001 |
| WO | 0243743 | A1 | 6/2002 |
| WO | 02055060 | A2 | 7/2002 |
| WO | 02078755 | A2 | 10/2002 |
| WO | 03022317 | A1 | 3/2003 |
| WO | 03047341 | A2 | 6/2003 |
| WO | 03068247 | A1 | 8/2003 |
| WO | 2004028461 | A2 | 4/2004 |
| WO | 2004035718 | A2 | 4/2004 |
| WO | 2004056346 | A1 | 7/2004 |
| WO | 2004108093 | A2 | 12/2004 |
| WO | 2005020915 | A1 | 3/2005 |
| WO | 2005032459 | A2 | 4/2005 |
| WO | 2005079582 | A1 | 9/2005 |
| WO | 2005099757 | A1 | 10/2005 |
| WO | 2005123103 | A1 | 12/2005 |
| WO | 2006000765 | A1 | 1/2006 |
| WO | 2006015317 | A2 | 2/2006 |
| WO | 2006022970 | A1 | 3/2006 |
| WO | 2006029213 | A1 | 3/2006 |
| WO | 2006029213 | A2 | 3/2006 |
| WO | 2006111624 | A2 | 10/2006 |
| WO | 2007005720 | A2 | 1/2007 |
| WO | 2007068938 | A2 | 6/2007 |
| WO | 2008035734 | A1 | 3/2008 |
| WO | 2009115804 | A1 | 9/2009 |
| WO | 2009130608 | A1 | 10/2009 |
| WO | 2010070292 | A1 | 6/2010 |
| WO | 2012061225 | A2 | 5/2012 |
| WO | 2012072980 | A1 | 6/2012 |
| WO | 2012136968 | A1 | 10/2012 |
| WO | 2014186590 | A1 | 11/2014 |

OTHER PUBLICATIONS

Russian Patent Application No. 2013149176 Official Action dated Feb. 21, 2018.

Swisher, R.D., Surfactant effects on humans and other mammals. The Soap and Detergent Association, Scientific and Technical Report No. 4: 1-8, 11, 16, 17, 19, Nov. 1966.

U.S. Appl. No. 13/990,755 Office Action dated Apr. 5, 2018.

Varani et al., Human skin in organ culture and human skin cells (keratinocytes and fibroblasts) in monolayer culture for assessment of chemically induced skin damage. Toxicol Pathol., 35(5):693-701, 2007.

Vengerovsky, A.I., Pharmaceutical incompatibility. Bulletin of Siberian Medicine, 3:12 pages, 2003. http.7/old.ssmu.ru/bu11/03/3/1684.pdf.

Australian Patent No. 2014265336 Second Examination Report dated Mar. 26, 2018.

Canadian Patent Application No. 2,745,059 Office Action dated Apr. 20, 2018.

(56) References Cited

OTHER PUBLICATIONS

Chinese Patent Application No. 201380073403.2 Third Office Action dated Mar. 26, 2018.
Chinese Patent Application No. 201480028155.4 Office Action dated Mar. 22, 2018.
Mexican Patent Application No. MX/a/2015/015197 Office Action dated Mar. 2, 2018.
Taiwanese Application No. 103117207 Office Action dated Apr. 13, 2018.
U.S. Appl. No. 14/654,498 Office Action dated May 3, 2018.
U.S. Appl. No. 15/372,299 Office Action dated Apr. 23, 2018.
Chile Patent Application No. 3274-2015 second Office Action dated Jan. 22, 2018.
Chinese Patent Application No. 201180066375.2 Reexamination Decision dated Dec. 20, 2017.
Japan Patent Application No. 2016-514095 Office Action dated Feb. 20, 2018.
Kryukov et al., The role of bacteriological examination in diagnosis of chronic tonsillitis. Becthnk 3:35-38, 2008.
Arata, J. *Staphylococcus aureus* and the skin. Japanese Journal of Chemotherapy, 49(3): 14 7-156, 2001.
Canadian Patent Application No. 2,745,059 Office Action dated Aug. 2, 2017.
Chile Patent Application No. 3274-2015 Office Action dated Jun. 20, 2017.
Japanese Patent Application No. 2014-242257 Office Action dated May 23, 2017.
Japanese Patent Application No. 2016-154639 Office Action dated Jun. 8, 2017.
Japanese Patent Application No. 2016-202835 Office Action dated Jun. 20, 2017.
Ono, N. A Semi-quantitative measurement of glycocalyx and an ATP bioluminescent assay for the analysis of Pseudomonas Aeruginosa biofilm. The Japanese Journal of Urology, 86(9):1440-1449, 1995.
Russian Patent Application No. 2013129866/1 O Protocol of a Meeting with the Examiner dated Jun. 14, 2017.
Sharma et al., Toluidine blue-mediated photodynamic effects on *Staphylococcal biofilms*. Antimicrobial Agents and Chemotherapy, 52(1):299-305, 2008.
U.S. Appl. No. 13/990,755 Office Action dated Jun. 29, 2017.
Usacheva et al., Interaction of the photobactericides methylene blue and toluidine blue with a fluorophore in Pseudomonas aeruginosa cells. Lasers in Surgery and Medicine, 40:55-61, 2008.
Wood et al., Erythrosine is a potential photosensitizer for the photodynamic therapy of oral plaque biofilms. Journal of Antimicrobial Chemotherapy, 57:680-684, 2006.
European Patent Application No. 17163418.1 extended European Search Report dated Sep. 17, 2017.
Japanese Patent Application No. 2015-200279 Office Action dated Aug. 31, 2017.
Canadian Patent Application No. 2,819,303 Office Action dated Oct. 24, 2017.
Chinese Patent Application No. 201280027537,6 Decision of Reexamination dated Oct. 27, 2017.
European Patent Application No. 13821122.2 Communication dated Oct. 30, 2017.
Japanese Patent Application No. 2015-548762 Office Action dated Oct. 10, 2017.
U.S. Appl. No. 14/654,498 Office Action dated Jul. 27, 2017.
U.S. Appl. No. 14/654,498 Office Action dated Nov. 17, 2017.
European Patent Application No. 12719420. 7 Examination Report dated Apr. 5, 2017.
Saudi Arabia Patent Application No. 515370133 2nd Examination Report dated Feb. 6, 2017.
Chinese Patent Application No. 201480028155.4 First Office Action dated Apr. 18, 2017. (no translation provided to date).
Banin et al., Chelator-induced dispersal and killing of Pseudomonas aeruginosa cells in a biofilm. Applied and Environmental Microbiology, 72(3):2064-2069, 2006.
Canadian Patent Application No. 2,745,059 Office Action dated Oct. 25, 2016.
Lewis K. Persister cells. Ann Rev Microbial. 2010; 64: 357-72.
Lipsky B, Aragón-Sánchez J, Diggle M, et al. IWGDF guidance on the diagnosis and management of foot infections in persons with diabetes. Diabetes Metab Res Rev. 2016; 32: 45-74.
Lipsky B, Dryden M, Gottrup F, et al. Antimicrobial stewardship in wound care: A position paper from the British society for antimicrobial chemotherapy and European wound management association. J Antimicrob Chemother 2016; 71: 3026-35.
Lipsky B. Medical treatment of diabetic foot infections. Clin Infect Dis. 2004; 39: S104-S114.
Lipsky B, Peters E, Senneville E, et al. Expert opinion on the management of infections in the diabetic foot. Diabetes Metab Res Rev. 2012; 28(suppl 1): 163-78.
Macia M, Roho-Molinero E, Oliver A. Antimicrobial susceptibility testing in biofilm-growing bacteria. Clin Microbial Infect. 2014; 20: 981-90.
Malone M, Bjarnsholt T, McBain A, et al. The prevalence of biofilms in chronic wounds: a systematic review and meta-analysis of published data. J Wound Care. 2017; 26: 20-5.
McDonnell G, Russell A. Antiseptics and disinfectants: Activity, action, and resistance. Clin Microbial Rev. 1999; 12: 147-79.
Meredith K, Burke N, Brownley H, et al. Antimicrobial efficacy of enhanced and standard silver wound dressings in an in vitro mature bioburden model. Symposium on Advanced Wound Care. 2018 Poster presentation: Las Vegas.
Metcalf D, Bowler P. Biofilm delays wound healing: A review of the evidence. Burns Trauma. 2013; 1: 5-12.
Metcalf D, Bowler P. Clinical Impact of an enhanced antimicrobial dressing in non-healing wounds previously managed with antibiotics. Symposium on Advanced Wound Care. 2018 Poster presentation: Las Vegas.
Metcalf D, Bowler P, Parsons D. In: Dhanasekaran D, ed. Wound Biofilm and Therapeutic Strategies, Microbial Biofilms—Importance and Applications. Rijeka, Croatia: InTech; 2016. https://www.intechopen.com/books/microbial-biofilms-importance-and-applications/woundbiofilm-and-therapeutic-strategies. Accessed Aug. 8, 2018.
Metcalf D, Parsons D, Bowler P. A next-generation antimicrobial wound dressing: a real-life clinical evaluation in the UK and Ireland. J Wound Care. 2016; 25: 132-8.
Metcalf D, Parsons D, Bowler P. Clinical safety and effectiveness evaluation of a new antimicrobial wound dressing designed to manage exudate, infection and biofilm. Int Wound J. 2017; 14: 203-13.
Nagoba B, Suryawanshi N, Wadher B, Selkar S. Acidic environment and wound healing: a review. Wounds. 2015; 27: 5-11.
Newman G, Walker M, Hobot J, Bowler P. Visualisation of bacterial sequestration and bactericidal activity within hydrating Hydrofiber wound dressings. Biomaterials. 2006; 27: 1129-39.
Nickel J, Wright J, Ruseska I, Marrie T, Whitfield C, Costerton J. Antibiotic resistance of pseudomonas aeruginosa colonizing a urinary catheter in vitro. Eur J Clin Microbial. 1985; 4: 213-18.
Nix D, Pierce B, Haugen V. Eliminating non-compliance. In Bryant Rand Nix D, eds. Acute and Chronic Wounds: Current Management Concepts. 5th ed. St. Louis, MO: Elsevier; 2016: 428-40.
Nussbaum S, Carter M, Fife C, et al. An economic evaluation of the impact, cost, and Medicare policy implications of chronic nonhealing wounds. Value Health. 2018; 21: 27-32.
Olsen I. Biofilm-specific antibiotic tolerance and resistance. Eur J Clin Microbial Infect Dis. 2015; 34: 877-86.
Percival S, Bowler P. Biofilms and their potential role in wound healing. Wounds. 2004; 16: 234-240.
Petchiappan A, Chatterji D. Antibiotic resistance: Current perspectives. ACS Omega 2017, 2, 7400-7409. https://www.researchgate.neUpublication/321019969/download. Accessed Jul. 7, 2018.
Phillips T. Chronic cutaneous ulcers: Etiology and epidemiology. J Invest Dermatol. 1994; 102: 38S-41S.
Rhoads D, Wolcott R, Percival S. Biofilms in wounds: management strategies. J Wound Care. 2008; 17: 502-9.
Rodeheaver G, Ratliff C. Wound cleansing, wound irrigation, wound disinfection. In: Krasner D, van Rijswijk L, eds. Chronic Wound

(56) References Cited

OTHER PUBLICATIONS

Care: The Essentials e-Book. Malvern, PA: HMP; 2018: 47-62. Available at: https://s3.amazonaws.com/whywoundcare/Files/ Chapter+ S.pdf. Accessed Jul. 7, 2018.
Romanelli M, Vowden K, Weir D. Exudate management made easy. Wounds International. 2014.http://www.woundsinternational.com/ made-easys/view/exudate-management-madeeasy-1. Accessed Jul. 11, 2018.
Rondas A, Schols J, Stobberingh E, Price P. Definition of infection in chronic wounds by Dutch nursing home physicians. Int Wound J. 2009; 6: 267-74.
Savage V, Chopra I, ONeill A. *Staphylococcus aureus* biofilms promote horizontal transfer of antibiotic resistance. Antimicrob Agents Chemother. 2013; 57: 1968-70.
Sen C, Gordillo G, Roy S, et al. Human skin wounds: A major and snowballing threat to public health and the economy. Wound Repair Regen. 2009; 17: 763-71.
Seth A, Zhong A, Nguyen K, et al. Impact of a novel, antimicrobial dressing on in vivo, Pseudomonas aeruginosa wound biofilm: quantitative comparative analysis using a rabbit ear model. Wound Repair Regen. 2014; 22: 712-9.
Shanmugam V, Couch K, McNish S, Amdur R. Relationship between opioid treatment and rate of healing in chronic wounds. Wound Repair Regen. 2017; 25: 120-30.
Song T, Duperthuy M, Nyunt-Wai, S.Sub-optimal treatment of bacterial biofilms. Antibiotics. 2016; 5: 1-18.
Spellberg B, Srinivasan A, Chambers H. New societal approaches to empowering antibiotic stewardship. JAMA. 2016; 315: 1229-30.
Stevens D, Bisno A, Chambers H, et al. Practice guidelines for the diagnosis and management of skin and soft tissue infections: 2014 update by the Infectious Diseases Society of America. Clin Infect Dis. 2014; 59: 147-59.
Stewart P. Antimicrobial tolerance in biofilms. Microbial Spectrum. 2015; 3: 1-30. https://www.ncbi.nlm.nih.gov/pmc/ articles/ PMC4507308/pdf/nihms697879.pdf. Accessed Jul. 24, 2018.
Stotts R. Wound Bioburden. In Baranoski, S, Ayello, E. eds. Wound Care Essentials: Practice and Principles. Philadelphia, PA: Wolters Klower; 2004: 121-48.
Thomas-Hess, C. Checklist for factors affecting wound healing. Adv Skin Wound Care. 2011; 24: 192.
Torkington-Stokes R, Metcalf D, Bowler P. Management of diabetic foot ulcers: valuation of case studies. Br J Nurs. 2016; 25: S27-S33.
Understanding biofilms. Bacteriality. Published online May 26, 2008. http://bacteriality.com/2008/05/biofilm/. Accessed Jul. 2, 2018.
United Nations. World Population Aging. New York. 2017. http:// www. u n .org/en/development/desa/popu lation/pu blicatio ns/pdf/ ageing/WPA2017 Highlights.pdf. Accessed Jul. 24, 2018.
Walker M, Bowler P, Cochrane C. In vitro studies to show sequestration of matrix metalloproteinases by silver-containing wound care products. Ostomy Wound Manage. 2007; 53: 18-25.
Walker M, Metcalf D, Parsons D, Bowler P. A real-life clinical evaluation of a next-generation antimicrobial dressing on acute and chronic wounds. J Wound Care. 2015; 24: 11-22.
Webb R. A chronic case of confusion. J of Wound Care. 2017; 26: 421.
Welsby S. The Spectrum Activity of AQUACEL Ag+ with Strengthening Fibre Ribbon using an In Vitro Corrected Zone of Inhibition Assay. 2015. ConvaTec data on file.
Wilkinson H, Stephenson C, Hardman M. Comparing the effectiveness of polymer debriding devices using a porcine wound biofilm model. Adv Wound Care. 2016; 5: 4 75-85.
Wolcott R. Biofilms cause chronic infections. J of Wound Care. 2017; 26: 423-5.
Wolcott R. Disrupting the biofilm matrix improves wound healing outcomes. J Wound Care. 2015; 24: 366-71.
Wolcott R, Rhoads D. A study of biofilm-based wound management in subjects with critical limb ischemia. J Wound Care. 2008; 17: 145-55.
Wolcott R, Sanford N, Gabrilska R, Oates J, Wilkinson, J, Rumbaugh K. Microbiota is a primary cause of pathogenesis of chronic wounds. J Wound Care. 2016; 25: Sup10: S33-S43.
Zölß C, Cech JD. Efficacy of a new multifunctional surfactant-based biomaterial dressing with 1% silver sulphadiazine in chronic wounds. Int Wound J. 2016; 13: 738-43. doi: 10.1111/iwj. 12 361.
Jasovský D, Littmann J, Zorzet A, Cars 0. Antimicrobial resistance—a threat to the world's sustainable development. Upsala J Med Sci. 2016; 121: 159-64.
Johani K, Malone M, Jensen S, et al. Microscopy visualisation confirms multi-species biofilms are ubiquitous in diabetic foot ulcers. Int Wound J. 2017; 14: 1160-9.
Keast D, Swanson T, Carville K, Fletcher J, Schultz G, Black J. Ten top tips . . . understanding and managing wound biofilm. Wounds International. 2014; 5: 20-3.
Kim D, Namen W, Moore J, Buchanan M, Hayes V, Myntti, M, Hakaim A. Clinical assessment of a biofilm-disrupting agent for the management of chronic wounds compared with standard of care: a therapeutic approach. Wounds. 2018; 30: 120-30.
Lazarus G, Cooper D, Knighton D, Percoraro R, Rodeheaver G, Robson M. Definitions and guidelines for assessment of wounds and evaluation of healing. Wound Repair Regen. 1994; 2: 165-70.
Parsons et al., Enhanced Performance and Mode of Action of a Novel Antibiofilm Hydrofiber Wound Dressing. BioMed Research International 2016: ID 7616471 :1-14 (2016).
Rodeheaver G, Ratliff C. Wound cleansing, wound irrigation, wound disinfection. In: Krasner D, van Rijswijk L, eds. Chronic Wound Care: The Essentials e-Book. Malvern, PA: HMP; 2018: 47-62. Available at: https://s3.amazonaws.com/whywoundcare/Files/ Chapter+ 5.pdf. Accessed Jul. 7, 2018.
Said et al., An in vitro test of the efficacy of an anti-biofilm wound dressing.Int J Pharm. 474(1-2):177-181 (2014).
Tarkington-Stokes R, Metcalf D, Bowler P. Management of diabetic foot ulcers: valuation of case studies. Br J Nurs. 2016; 25: S27-S33.
Australia Patent Application No. 2014265336 Examiner's First Report dated Mar. 29, 2017.
U.S. Appl. No. 14/114,517 Office Action dated Oct. 20, 2016.
51 0(k) Premarket Notification, AQUACEL® and AQUACEL® Ag, Section 5: 51 0(k) Summary revised Apr. 21, 2008, 6 pages.
Bowler et al., Dressing conformability and silver-containing wound dressings. Wounds U.K., 6: 14-20 (2010).
Database Biosis, Biosciences Information Service, Philadelphia, PA, 1992, Kida N., et al., "Effect of PH on Preferential Antibacterial Activity of Ethylenediaminetetraacetic Acid EDTA," XP002485724, Database Accession No. PREV199294118093.
Database Biosis, Biosciences Information Service, Philadelphia, PA, 2005, Percival, L, et al., "Tetrasodium EDTA as a novel central venous catheter lock solution against biofilm," XP002485725, Database Accession No. PREV200600021247.
Gilbert, P., et al., The Use of Poloxamer Hydrogels for the Assessment of Biofilm Susceptibility Towards Biocide Treatments, Journal of Applied Microbiology, 1998, 85:985-990.
Jones et al., Antimicrobial activity of silver-containing dressings is influenced by dressing conformability with a wound surface. Wounds, 17:263-270 (2005).
Lineaweaver et al., Topical antimicrobial toxicity. Arch Surg., 120(3):267-70 (1985).
Ovington, The Value of Silver in Wound Management. Podiatry Today, Dec. 1999, 12(7):59-62. (marked as Exhibit 3 at the Deposition of Fiona Adam).
Parikh et al., Antimicrobial silver/sodium carboxymethyl cotton dressings for burn wounds Textile Research Journal, 75(2):134-138 (2005).
PCT Patent Application No. PCT/GB2012/000329 International Search Report and Written Opinion dated Jul. 17, 2012.
PCT Patent Application No. PCT/US2014/038224 International Preliminary Report on Patentability issued Nov. 17, 2015.
PCT Patent Application No. PCT/US2014/038224 International Search Report mailed Sep. 15, 2014.
PCT Patent Application No. PCT/US2014/038224 Written Opinion mailed Sep. 15, 2014.
Pennington JA. , A review of iodine toxicity reports. J Am Diet Assoc., 90(11 ): 1571-81 (1990).

(56) References Cited

OTHER PUBLICATIONS

Poon and Burd, In vitro cytotoxity of silver: implication for clinical wound care. Burns. 30(2):140-147 (2004).
Senter, A Textbook of Organic Chemistry, Fifth Ed. 1919, pp. 435-443.
Thomas and Mccubbin, An in vitro analysis of the antimicrobial properties of 10 silvercontaining dressings. The Journal of Wound Care, Sep. 2003, 12(8):105-108.
U.S. Appl. No. 09/997,545 Office Action dated Feb. 10, 2003.
U.S. Appl. No. 09/997,545 Office Action dated Jul. 3, 2002.
U.S. Appl. No. 10/734,784 Office Action dated Apr. 4, 2007.
U.S. Appl. No. 11/610,671 Office Action dated Apr. 2, 2008.
United States U.S. Appl. No. 11/610,671 Office Action dated Apr. 7, 2011.
U.S. Appl. No. 11/610,671 Office Action dated Aug. 17, 2009.
U.S. Appl. No. 11/610,671 Office Action dated Dec. 3, 2008.
U.S. Appl. No. 11/610,671 Office Action dated Feb. 18, 2010.
U.S. Appl. No. 11/610,671 Office Action dated Mar. 11, 2015.
U.S. Appl. No. 11/610,671 Office Action dated Mar. 20, 2014.
U.S. Appl. No. 11/610,671 Office Action dated Oct. 20, 2011.
U.S. Appl. No. 11/610,671 Office Action dated Oct. 8, 2014.
U.S. Appl. No. 11/610,671 Office Action dated Sep. 12, 2013.
U.S. Appl. No. 12/406,316 Office Action dated Apr. 4, 2012.
U.S. Appl. No. 12/406,316 Office Action dated Apr. 5, 2013.
U.S. Appl. No. 12/406,316 Office Action dated Aug. 10, 2011.
U.S. Appl. No. 12/406,316 Office Action dated Nov. 26, 2012.
U.S. Appl. No. 14/114,517 Office Action dated Apr. 23, 2015.
U.S. Appl. No. 14/114,517 Office Action dated Aug. 13, 2015.
White, An historical overview of the use of silver in wound management. Actisorb Silver 220, The Silver Supplement Part Two: Clinical Evidence, 6(Supp. Pt. 2): 6 pages (2001).
Wirtanen, et al., Performance Evaluation of disinfectant Formulations Using Poloxamerhydrogel Biofilm-constructs, Journal of Applied Microbiology, 1998, 85:965-971.
Russian Patent Application No. 2015153446 Office Action dated Feb. 10, 2016 (In Russian).
Smith and Nephew, OTC medication information: Dermal wound cleanser—benzethonium chloride spray. Dec. 17, 2009, p. 1-6. XP55031919.
Ramage et al., Inhibition on Candida albicans biofilm formation using divalent cation chelators (EDTA). Mycopathologia, Kluwer Academic Publishers, 164(6):301-306 (2007). XP019555313.
Percival et al., Tetrasodium EDTA as a novel central venous catheter lock solution against biofilm. DATA Biosis (online), Jun. 1, 2005, 6 pages. XP002485725.
Nagai et al., Suppressive effects of EDTA for Pseudomonas aeruginosa products biofiim. STN CAPLUS, Jan. 1, 1996, 1 page. XP002122029.
Chinese Patent Application No. 201280027537.6 Chinese Third Office Action dated Mar. 2, 2016.
Chinese Patent Application No. 201280027537.6 Office Action dated Sep. 12, 2016.
European Patent Application No. 12719420.7 Communication dated Jul. 20, 2016.
European Patent Application No. EP 06820530.1 Communication dated Apr. 7, 2016.
Japanese Patent Application No. 2015-200279 Office Action dated Jul. 12, 2016.
Kaur et al., Effect of certain chelating agents on the antibacterial action of silver nitrate. Journal of Hygiene, Epidemiology, Microbiology and Immunology. 32(3):299-306, 1988.
Muller et al. pH-dependent formation of ethylene diamine tetra acetic acid supramolecular aggregates. FEBS Lett 340:17-21 (1994).
PCT/GB2006/004691 International Search Report dated Jul. 7, 2008.
Reybrouck et al., Effect of ethylene diamine tetra acetate on the germicidal action of disinfectants against "Pseudomona." Acta Clinica Belgica, 24(1):32-41, 1969.
Russian Patent Application No. 2013149176 Official Action dated Jun. 2, 2016.
U.S. Appl. No. 14/114,517 Office Action dated Mar. 24, 2016.
U.S. Appl. No. 14/795,176 Office Action mailed Feb. 3, 2016.
AMR: a major European and Global challenge: fact sheet. Antimicrobial Resistance—European Commission (EC-AMR) Sep. 8, 2017. https://ec.europa.eu/health/amr/sites/amr/files/amr_factsheet_en.pdf. Accessed Jul. 2, 2018.
Anwar H, Dasgupta M, Costerton J. Testing the susceptibility of bacteria in biofilms to antibacterial agents. Antimicrob Agents Chemother. 1990; 34: 2043-2046.
Bay L, Kragh K, Eickhardt S, et al. Bacterial aggregates establish at the edges of acute epidermal wounds. Adv Wound Care. 2018; 7: 105-13.
Bohn G, Liden B, Schultz G, et al. Ovine-based collagen matrix dressing: Next-generation collagen dressing for wound care. Adv Wound Care. 2016; 5: 1-10.
Bowler P. Antibiotic resistance and biofilm tolerance: a combined threat in the treatment of chronic infections. J Wound Care. 2018 27: 273-277.
Bowler P, Jones S, Davies B, Coyle E. Infection control properties of some wound dressings. J Wound Care. 1999; 8: 499-502.
Bowler P, Jones S, Towers V, et al. Dressing conformability and silver-containing wound dressings. Wounds UK. 2010; 6: 14-20.
Bowler P, Parsons D. Combatting wound biofilm and recalcitrance with a novel anti-biofilm Hydrofiber® wound dressing. Wound Medicine. 2016; 14: 6-11.
Bryant R, Nix D. Principles for practice development to facilitate outcomes and productivity. In Bryant Rand Nix D, eds. Acute and Chronic Wounds: Current Management Concepts. 5th ed. St. Louis, MO: Elsevier; 2016: 1-20.
Cavaliere R, Ball J, Turnbull L, Whitchurch C. The biofilm matrix destabilizers, EDTA and DNaseI, enhance the susceptibility of nontypeable Hemophilus influenzae biofilms to treatment with ampicillin and ciprofloxacin. Microbiology. 2014; 3: 557-67.
Centers for Disease Control and Prevention. Antibiotic Resistance Threats in the United States. 2013. http://www.cdc.gov/drugresistance/threat-report-2013/pdf/ar-threats-2013-508.pdf. Accessed Aug. 1, 2018.
Chan B, Cadarette S, Wodchis W, Wong J, Mittmann N, Kran M. Cost-of-illness studies in chronic ulcers: A systemic review. J Wound Care. 2017; 26: S4-S15.
Ciofu 0, Rojo-Molinero E, Macia M, Oliver A. Antibiotic treatment of biofilm infections. APMIS. 2017; 125: 304-19.
Costerton J, Geesey G, Cheng K. How bacteria stick. Sci Am. 1978; 238: 86-95.
Costerton J, Irvin R, Cheng K. The bacterial glycocalyx in nature and disease. Ann Rev Microbial. 1981; 35: 299-324.
Costerton J, Stewart P, Greenberg E. Bacterial biofilms: a common cause of persistent infections. Science. 1999; 284: 1318-22.
Costerton JW. Bacterial biofilms in nature and disease. Ann Rev Microbial. 1987; 41: 435-64.
Dini V, Salvo P, Janowska A, Di Francesco F, Barbini A, Romanelli M. Correlation between wound temperature obtained with an infrared camera and clinical wound bed score in venous leg ulcers. Wounds. 2015; 27: 274-8.
Doughty D, Sparks B. Wound healing physiology and factors that affect the wound repair process. In Bryant Rand Nix D, eds. Acute and Chronic Wounds: Current Management Concepts. 5th ed. St. Louis, MO: Elsevier; 2016: 63-81.
Eming S, Martin P, Tomic-Canic M. Wound repair and regeneration: mechanisms, signaling, and translation. Sci Transl Med. 2014; 6: 57-72. doi: 10.1126/scitranslmed.3009337.
Etebu E, Arikekpar I. Antibiotics: Classification and mechanisms of action with emphasis on molecular perspective. Int J of Appl Microbial and Biothech Res. 2016; 4: 90-101. http://www. bluepe njou rnals .org/ijam br/pdf/2016/Octo ber/ Etebu_ and_Arikekpar. pdf. Accessed Aug. 8, 2018.
European Centre for Disease Prevention and Control (ECDC). Proposals for EU Guidelines on the Prudent Use of Antimicrobials in Humans. Stockholm: ECDC; 2017. http://ecdc.europa.eu/en/publications/_layouts/forms/Publication_DispForm.aspx?List=4f55ad51-4aed-4d32-b960-af70113dbb90&ID=1643. Accessed Jul. 2, 2018.

(56) References Cited

OTHER PUBLICATIONS

Fife C, Carter M, Walker D, Thomson B. Wound care outcomes and associated cost among patients treated in US outpatient wound centers: Data from the US Wound Registry. Wounds. 2012; 24: 10-7.
Finnegan S, Percival S. EDTA: an antimicrobial and antibiofilm agent for use in wound care. Adv Wound Care. 2015; 4: 415-21.
Fleming D, Rumbaugh K. Approaches to dispersing medical biofilms. Microorganisms. 2017; 5: 1-16.
Frykberg R, Banks J. Challenges in the treatment of chronic wounds. Adv Wound Care. 2015; 4: 560-82.
Gardner S, Frantz R, Doebbeling B. The validity of the clinical signs and symptoms used to identify localized chronic wound infection. Wound Repair Regen. 2001; 9: 178-86.
Gardner S, Hillis S, Frantz R. Clinical signs of infection in diabetic foot ulcers with high microbial load. Biol Res Nurs. 2009; 11: 119-28.
Gilchrist M, Seaton R. Outpatient parenteral antimicrobial therapy and antimicrobial stewardship: challenges and checklists. J Antimicrob Chemother. 2015; 70: 965-70.
Gottrup F. A specialized wound-healing center concept: importance of a multidisciplinary department structure and surgical treatment facilities in the treatment of chronic wounds. Am J Surg. 2004; 187: S38-S43.
Gottrup F, Apelqvist J, Bjarnsholt T, et al. Antimicrobials and non-healing wounds: Evidence, controversies and suggestions—key messages. J Wound Care. 2014; 23: 477-8, 480,482.
Guest JF, Vowden K. The health economic burden that acute and chronic wounds impose on an average clinical commissioning group/health board in the UK. J Wound Care. 2017; 26: 292-303.
Harding K, Szczepkowski M, Mikosinski J, et al. Safety and performance evaluation of a nextgeneration antimicrobial dressing in patients with chronic venous leg ulcers. Int Wound J. 2016; 13: 442-8.
Howell J, Stair T, Howell A, Mundt D, Falcone A, Peters S. The effect of scrubbing and irrigation with normal saline, povidone iodine, and cefazolin on wound bacterial counts in a Guinea pig model. Am J Emerg Med. 1993; 11: 134-38.
Hurlow J, Blanz E, Gaddy J. Clinical investigation of biofilm in non-healing wounds by high resolution microscopy techniques. J Wound Care. 2016; 25(suppl 9): S11-S22.
International Wound Infection Institute (IWII). Wound infection in clinical practice. Wounds International, 2016. http://www.woundinfection-institute.com/wp-content/uploads/2017 /03/IWIIWound-infection-in-clinical-practice.pdf. Accessed Jul. 2, 2018.
James G, Swogger E, Wolcott R, et al. Biofilms in chronic wounds. Wound Repair Regen. 2008; 16: 37-44.
Chinese Office Action, China National Intellectual Property Administration, Chinese Patent Application No. 202110186761.0, Nov. 29, 2022, 5 pages.
Capinera et al., Insectional activity of photoactive dyes to American and migratory grasshoppers (*Orthoptera acrididae*). J.Econ. Entomol., 92(3):662-666, 2000.
Ceri et al., The Calgary biofilm device: New technology for rapid determination of antibiotic susceptibilities of bacterial biofilms. Journal of Clinical Microbiology, 37(6): 1771-1776, 1999.
Chemburu et al., Light-induced biocidal action of conjugated polyelectrolytes supported on colloids Langmuir, 24:11053-11062 (2008).
Chinese Patent Application No. 201180066375.2 Office Action dated Sep. 26, 2016.
Demidova and Hamblin, Photodynamic therapy targeted to pathogens Int. J. Immunopathol Pharmacol., 17(3):245-254, 2004.
Dougherty et al., Photodynamic therapy. Journal of the National Cancer Institute, 90(12): 889-905, 1998.
European Patent Application No. 09795521.5 Communication dated Mar. 24, 2017.
European Patent Application No. EP 06820530.1 Communication dated Jan. 30, 2013.
European Patent Application No. EP 06820530.1 Communication dated Mar. 30, 2009.
Harrison-Balestra et al., A wound isolatedPseudomonas aeruginosagrows a biofilm in vitro within 1 O hours and is visualized by light microscopy. Dermatol. Surgery, 29(6):631-635, 2003.
Japanese Patent Application No. 2013-541415 Final Rejection dated Jun. 14, 2016.
Japanese Patent Application No. 2014-242257 Office Action dated Apr. 5, 2016.
Japanese Patent Application No. 2014-543972 Office Action dated Dec. 20, 2016.
Kapoor et al., Fluorescence and absorption spectra of Rose-Bengal dye in the presence of surfactants. Journal of Luminescence, 22(4):429-439, 1981. (Abstract only).
Mexican Patent Application No. MX/a/2013/006090 Official Action dated Jun. 7, 2016.
PCT/GB2006/004691 International Preliminary Report on Patentability dated Aug. 12, 2008.
PCT/GB2006/004691 Written Opinion dated Jul. 7, 2008.
PCT/GB2009/002912 International Preliminary Report on Patentability dated Jun. 21, 2011.
PCT/GB2009/002912 International Search Report and Written Opinion issued Mar. 2, 2010.
PCT/GB2011/001665 International Preliminary Report on Patentability dated Jun. 4, 2013.
PCT/GB2011/001665 International Search Report dated Mar. 2, 2012.
PCT/GB2011/001665 Written Opinion dated Mar. 2, 2012.
Russian Patent Application No. 2013129866 Office Action dated Oct. 21, 2016.
Tallardia. Drug synergism: Its detection and applications. The Journal of Pharmacology and Experimental Therapeutics, 298(3):865-872, 2001.
U.S. Appl. No. 13/990,755 Office Action dated Jan. 19, 2017.
U.S. Appl. No. 11/610,671 Office Action dated Apr. 7, 2011.
U.S. Appl. No. 13/124,472 Office Action dated Feb. 16, 2016.
U.S. Appl. No. 13/124,472 Office Action dated Jan. 18, 2013.
U.S. Appl. No. 13/124,472 Office Action dated Jun. 21, 2013.
U.S. Appl. No. 13/124,472 Office Action dated Jun. 4, 2015.
U.S. Appl. No. 13/124,472 Office Action dated Oct. 3, 2014.
U.S. Appl. No. 13/990,755 Office Action dated May 5, 2016.
Wainwright. Photodynamic antimicrobial chemotherapy (PACT). Journal of Antimicrobial Chemotherapy, 42:13-28, 1998.
Wainwright et al., The Use of new methylene blue in Pseudomonas aeruginosa biofilm destruction. Biofouling, 18:247-249, 2002. (Abstract only).
European Patent Application No. 14797983.5 Supplementary European Search Report dated Dec. 6, 2016.
Saudi Arabia Patent Application No. 515370133 Examination report dated Oct. 18, 2016.
Japanese Patent Application No. 2015-200279 Office Action dated Feb. 7, 2017.
Kita et al., pH-Dependent preferential antibacterial activity of Ethylenediaminetetraacetic acid (EDTA). Japanese Journal of Bacteriology, 47(4):6 pages, 1992.
Canadian Office Action, Canadian Intellectual Property Office, Canadian Patent Application No. 2,910,285, Dec. 14, 2020, 4 pages.
Canadian Patent Application No. 2834871 Office Action dated Oct. 1, 2018.
Canadian Patent Application No. 2,745,059 Office Action dated Dec. 17, 2018.
Chinese Patent Application No. 201480028155.4 Decision on Rejection dated Nov. 21, 2018.
Indian Patent Application No. 5856/DELNP/2013 First Examination Report dated Jun. 20, 2018.
U.S. Appl. No. 13/990,755 Advisory Action dated Jan. 2, 2019.
U.S. Appl. No. 15/372,299 Final Office Action dated Nov. 9, 2018.
Australian Patent Application No. 2013366038 Examination Report No. 2 dated Jun. 19, 2018.
Canadian Patent Application No. 2,834,871 Office Action dated Jan. 31, 2018.
European Patent Application No. 12719420.7 Examination Report dated Aug. 7, 2018.
Japanese Patent Application No. 2015-548762 Office Action dated Jul. 31, 2018.

(56) References Cited

OTHER PUBLICATIONS

Kite et al., Use of in vivo-generated biofilms from hemodialysis catheters to test the efficacy of a novel antimicrobial catheter lock for biofilm eradication in vitro. J Clin Microbial., 42.7 (2004): 3073-3076.

Hobot et al., Effect of Hydrofiber wound dressings on bacterial ultrastructure. J Electron Microsc (Tokyo). 57(2):67-75 (2008).

* cited by examiner

WOUND DRESSING COMPRISING AN ANTIMICROBIAL COMPOSITION

CROSS-REFERENCE

This application is a divisional application of, and claims the benefit of, U.S. application Ser. No. 14/889,818, which was filed on Nov. 6, 2015, and which is a U.S. national stage application of International App. No. PCT/US2014/038224, which was filed on May 15, 2014, and which claims the benefit of priority of GB 1308770.5, which was filed on May 15, 2013. The contents of those applications are incorporated by reference herein in their entireties.

BACKGROUND

This invention relates to wound dressings which comprise an antimicrobial composition where the dressing can be applied to skin, wounds, cuts, abrasions or burns for the prevention or treatment of infections. More particularly, the invention relates to a dressing capable of providing effective antimicrobial activity while at the same time avoiding wound and skin irritation and retardation of wound healing. In particular, the invention relates to a dressing comprising chemically modified cellulosic fibres comprising an antimicrobial composition where the dressing properties are not compromised by the addition of the antimicrobial composition.

Overuse of antibiotics and the associated increase in bacterial resistance is impacting the efficacy of antibiotics in the treatment of wound infection. Effective alternatives to antibiotics are thus desirable.

Topical antimicrobial materials and preparations containing them have long been recognized as playing an important part in minimizing the opportunity for skin and wound infections. Non-antibiotic antimicrobials are non-selective chemical agents that can be safe to use on living tissue. Molecular iodine, ionic silver and oxidizing agents such as sodium hypochlorite and chlorine dioxide have been recognized as antimicrobial agents with effectiveness against a wide range of micro-organisms. There are however several barriers to making an effective antimicrobial composition for application to wounds based on such agents. One barrier is that these antimicrobial agents tend to react with organic materials found in the wound other than the intended microbial targets. This means that to be effective, antimicrobial agents need to be included in treatment compositions at high levels, which may cause undesirable side effects with prolonged use such as cell toxicity, hypersensitivity reactions, skin staining and systemic effects. Such side effects are further described in "In vitro cytotoxity of silver: implication for clinical wound care". Poon V K, Burd A. Burns. 2004 March; 30(2):140-7, "A review of iodine toxicity reports". Pennington J A. J Am Diet Assoc. 1990 November; 90(11):1571-81 and "Topical antimicrobial toxicity". Lineaweaver W, Howard R, Soucy D, McMorris S, Freeman J, Crain C, Robertson J, Rumley T. Arch Surg. 1985 March; 120(3):267-70.

A further barrier is in the delivery of the antimicrobial composition to the wound. If the composition is to be delivered from a wound dressing, it is preferable that the dressing be sufficiently usable such that the antimicrobial wound dressing is conformable, in its dry state, so that a close contact between the wound bed and the dressing is obtained, that the antimicrobial wound dressing maintain its form and structure upon storage and that sufficient strength is maintained in the dressing. If the dressing is stiff, it is possible that not only will the dressing not conform to the wound site on the patient but also will not conform to the contour of the wound bed. In that circumstance, voids can exist between the dressing and the wound which allow bacteria to grow. If large enough, those voids will not be closed even when the dressing is hydrated (on absorption of exudate) allowing the spread of bacteria under the dressing. Dry conformability in the dressing is therefore desirable as is close contouring of the dressing to the wound when hydrated. Jones, S A, Bowler P G, Walker, M., "Antimicrobial activity of silver-containing dressings is influenced by dressing conformability with a wound surface" Wounds 17:263-270 (2005); Bowler, P., Jones, S., Towers, V., Booth, R., Parsons, D., Walker, M., "Dressing conformability and silver-containing wound dressings" Wounds U.K. 6:14-20 (2010).

There is also a need for a means to make treatment compositions effective without simply increasing the level of antimicrobial agent included in the composition. It has also been recognised that wound bacteria often exist in biofilms and that these are more difficult to treat than their planktonic counterparts.

SUMMARY/DETAILED DESCRIPTION OF THE INVENTION

It is known to increase the effectiveness of antimicrobial metal ions by including a quaternary cationic surfactant in the formulation. WO 2012/136968 discloses an antimicrobial composition suitable for use on skin and wounds comprising a source of antimicrobial metal ion and a quaternary cationic surfactant.

The presence of the quaternary cationic surfactant enhances the effect of the antimicrobial metal ion so that the performance of the antimicrobial metal ion is improved. For instance the presence of the quaternary cationic surfactant can increase the rate at which the antimicrobial metal ion exerts its antimicrobial effect. The composition preferably also comprises ethylenediaminetetra-acetic acid (EDTA). EDTA is preferably present as the di-, tri- or tetra-basic salts of EDTA. We have found that these salts enhance the antimicrobial effect of the ionic metal in disrupting biofilm.

While the presence of the quaternary cationic surfactant enhances the effect of the antimicrobial metal ion, when that metal ion is being applied to a wound from a wound dressing, the presence of the surfactant can affect the drying properties of the dressing so that dressing performance is affected and the wound dressing is sufficiently usable. Treatment with a quaternary cationic surfactant can especially affect the rate of drying of the dressing, increasing it so that the resulting dressing is stiff and does not conform well to the wound.

It is known to make wound dressings from chemically modified cellulosic fibres. For instance GB-A-2220881 and GB-A-2094802 describe the production of carboxymethylcellulose fibres from regenerated cellulose fibres (viscose rayon) fibres or from cotton. It is also known that carboxymethylcellulose fibre of greater absorbency and strength can be produced from solvent-spun cellulose fibre. Such fibres are described in EP 0616650 and are manufactured by reacting solvent spun cellulose fibre with a strong alkali and a monochloroacetic reagent. It is also known that alternative chemical modification of cellulose fibres is possible and also has the effect of increasing the absorbency of the cellulose fibre. The cellulose fibre can for instance be modified by sulphonation, for example by substitution with an alkyl sulphonate at one or more of the hydroxyl groups on the anhydroglucose monomers that make up the cellulose backbone forming ether linkages. Modified cellulose of this type is known as cellulose sulphonate or cellulose alkyl sulphonate some of the insoluble forms of which are described in WO2012/061225.

Modifying the cellulose fibre requires the fibre to be exposed to one or more reagents which modify the cellulose by substitution, the degree of substitution determining the absorbency and solubility of the fibre.

Once the modification has taken place, the fibres are washed to remove any unreacted alkali, chloroacetate, alkylsulphonate, other modifying agent or any by-products such as sodium chloride or sodium glycollate. An aqueous wash is generally used initially, preferably a mixture of water with a water-miscible organic solvent such as water and IMS (industrial methylated spirit), the major portion of the wash being organic solvent. After washing, the fibres can be treated with the antimicrobial composition including an antimicrobial metal in a manner such as those described in EP1318842, EP1425050, EP1882482, EP1343510 or EP2262545.

Following this the fibres are dried at low temperature for instance as described in EP 0680344, by forced air drying or radiant heat drying.

As the washing step or steps and the treatment steps, to which the fibres are subjected following modification, involve the use of relatively high percentages of organic solvents such as IMS, the drying of the fibres requires the solvents that are released to be managed from an environmental and safety perspective.

We have also found that the treating modified cellulose fibres with an antimicrobial composition comprising a cationic surfactant can result in fibres that have different drying characteristics than untreated fibres, and lead to decreased usability of the resulting wound dressing. For instance, for fibres with an increased rate and/or extent of drying insufficient moisture can lead to embrittlement which in turn leads to fibre breakage on opening, carding and needling and the formation of dust. The subsequent reduced length staple fibre may then produce a weaker and lighter fabric with less loft, and lower absorbency. More importantly, the conformability of the dressing can be affected which itself can lead to poor antimicrobial performance as the dressing is not in close contact with the wound.

We have now found that it is possible to mitigate the problem of decreased usability, such as a lack or decrease of conformability of wound dressings comprising modified cellulosic fibres treated with an antimicrobial composition comprising a quaternary ammonium surfactant by controlling the moisture content of the wound dressing at the time of packaging and maintaining that moisture content in the dressing until the time of use.

Accordingly, the invention provides a wound dressing comprising modified cellulosic fibres treated with an antimicrobial composition comprising a source of an antimicrobial metal ion and a quaternary cationic surfactant, the dressing having a moisture content of at least 10% or at least 10.5%, 11%, 12%, 13%, 14% or 15%, more preferably between 10% and 20% by weight at the time of packaging in a sealed package to maintain the moisture content in that range until the time of use of the dressing.

By the term antimicrobial is meant a substance that inhibits the growth of, or kills, micro-organisms from the taxonomical kingdoms of bacteria, fungi and protozoa. An effective antimicrobial composition is therefore one which is used to reduce and prevent the spread and proliferation of micro-organisms in a specific application. In wound care this can be interpreted in terms of control of cross-infection, prevention or elimination of infection and the reduction of recalcitrant bioburden that can cause delayed healing and chronicity.

The dressing according to a first aspect of the invention comprises an antimicrobial agent, preferably a metal ion for example the transition metals, antimony, silver, iron, nickel, copper, chromium, manganese, gold, gallium, germanium, mercury, arsenic, aluminium, lead, zinc, bismuth, tin and palladium. Preferably the metal ion is silver. The antimicrobial agent is preferably included in the dressing at a level of from 0.01% to 10% by weight, more preferably 0.1% to 5% and even more preferably 0.5% to 1.5% by weight or 1% to 5%. If the composition is in aqueous solution the antimicrobial metal ion is preferably in an aqueous solution comprising from 0.00001% to 1.0% by weight or more preferably 0.0001% to 0.1%, even more preferably 0.0001% to 0.02% by weight or 0.001% to 1.0% by weight.

The dressings according to the invention comprise a cationic surfactant. The cationic surfactant can be a quaternary ammonium salt, an alkyl pyridinium salt, an alkyl imidazolium salt, an alkyl morpholinium salt, a benzethonium salt or an ethoxylated quaternary ammonium salt or mixtures thereof. Preferably where the salt is a quaternary ammonium salt, it is selected from the group of monoalkyl trimethyl ammonium salts, dialkyl dimethyl ammonium salts and monoalkyl monobenzyl dimethyl ammonium salts. Preferably the cationic surfactant is a quaternary cationic surfactant and more preferably a quaternary ammonium surfactant. Preferably the cationic surfactant is selected from the group of benzethonium, benzalkonium, dimethyldialkylonium, alkylpyridinium and alkyltrimethylammonium cations with any counter ion, for example: bromide, chloride, acetate or methyl sulphate. Preferably the quaternary cationic surfactant is present at a level of more than or equal to 0.025% by weight, more preferably from 0.05% to 4% by weight and more preferably from 0.1% to 2% by weight.

The dressing preferably comprises a metal chelating agent, for example a citrate or polyphosphate or ethylenediaminetetra-acetic acid (EDTA). EDTA is preferably present as the di-, tri- or tetra-basic salts of EDTA. We have found that these salts enhance the antimicrobial effect of the ionic metal in disrupting biofilm.

The pH of the composition is preferably between 4 and 8, more preferably between 4 and 6 and most preferably between 4.5 and 5.5. The desired pH may be achieved by incorporating buffering agents in the composition. Examples of buffering agents which may be included are citric acid/di-sodium hydrogen phosphate, citric acid/sodium citrate, acetic acid/sodium acetate. The buffering agent may conveniently be present in an amount of about 0.5% to 2% by weight of the composition so as to provide an isotonic composition.

The antimicrobial compositions may be in the form of a solution which can be used as a spray to be applied to the dressing or a solution dip into which the dressing can be immersed. Preferably the pH of the formulation is buffered at around 5.5 as this does not alter the pH balance of the periwound tissue and therefore protects it. EDTA is preferably present in the compositions at a level of 0.1% to 4% by weight of the composition, more preferably less than 2% by weight, more preferably 0.2 to 1% by weight.

The dressings according to the invention can be made by modifying cellulosic fibres for instance by the methods described in EP 0616650 or WO 2012/061225 to obtain a fibre which is capable of gelling on the absorption of exudate from the wound. The antimicrobial metallic ion can then be added to the fibres by an ion exchange process in a largely organic solvent followed by washing in an aqueous organic solution which also comprises an optional salt for photostabilising the metallic ion if appropriate and the optional metal chelating agent. The fibre is then washed again in an organic solvent wash and warm air dried. The fibre can then be processed to form a dressing by conventional means. The optional photostabilising agent can be added as described in EP1343510.

The moisture content of the dressing is between 10% and 20%. Preferably the moisture content of the dressing is between 11% and 18%, more preferably it is between 11.5% and 15% by weight and most preferably it is between 11.5 and 13% by weight. In some embodiments, the moisture content of the dressing is at least 10% or at least 10.5%, 11%, 11.5%, 12%, 12.5%, 13%, 13.5%, 14%, 14.5% or 15%. A moisture content of 12% or 12.5% is particularly preferred. The moisture content of the dressing may, amongst other techniques, be measured indirectly by measuring conductivity of the resulting wound dressing. In other embodiments, the moisture content of the dressing may be measured by measuring the loss on drying of the manufactured dressing. In still other embodiments the moisture content may be measured by titration techniques (Karl Fischer) which is done by solvent extraction of the water in the dressing or by oven heating followed by water capture by solvent chemicals. The method of measuring moisture content in a dressing is not limited to the above, but may be accomplished using other techniques and/or by other technologies known in the field.

The moisture content of the dressings provided herein may be maintained by controlling environmental conditions during manufacturing. For example, cleanrooms may be employed during manufacturing controlling several environmental factors, including air pressure, air flow (including directional flow), air quality (including filtration) and humidity (including room temperature and pressure). All of these environmental factors may contribute to the establishment of the required moisture content of the dressings as disclosed herein. For example, temperature control is typically maintained at 18° C., +2° C., preferably +1° C. Relative humidity is typically maintained at pre-determined levels, including at least at 50% RH, 55% RH, 60% RH, 65% RH, 70% RH, 75% RH, 80% RH, 85% RH+5% RH, and preferably at +3% RH, depending upon the moisture content of the fibre being processed. These environmental factors may also be adjusted against each other in order to achieve the moisture content desired as disclosed herein.

Moreover, dressings that are further processed (for example, textiled or conditioned) and/or stored are first packaged in moisture impermeable packaging material or film and sealed prior to movement or storage of the dressings. Examples of moisture-impermeable packaging material include polyethylene, aluminium, polyester, mixtures thereof or any other suitable material or mixtures thereof, including a trilaminate film of polyethylene, aluminium foil and a polyester that ensures protection from light, oxygen and moisture transmission.

In some embodiments, the improvement in usability of wound dressings comprising surfactants as described herein results in the substantial maintenance of conformability as compared to a wound dressing without surfactant present. In other embodiments, the improvement in usability of wound dressings comprising surfactants as described herein results in a measurable improvement in tensile strength as compared to wound dressings with a moisture content of less than 10%. In yet other embodiments, the improvement in usability of wound dressings comprising surfactants as described herein results in a measurable improvement in tensile strength as compared to wound dressings stored at ambient temperature or in zero humidity conditions. In still other embodiments, the improvement in usability of wound dressings comprising surfactants as described herein results in the substantial maintenance of wound dressing structure, including lack of dust formation, as compared to wound dressings stored at ambient temperature or in zero humidity conditions.

EXAMPLES

The following examples are illustrative of the present invention.

Example 1

Effect of moisture content on the tensile strength of silver containing wound dressings according to the invention.

Dressings according to the invention were prepared by modification of solvent spun cellulose tow to a degree of substitution of 0.3 to form carboxymethylcellulose, neutralising to a pH of 5.5 with an organic acid. Adding 1.2% cationic silver by an ion exchange process in a largely organic solvent such as by the process described in EP1343510, washing in an aqueous organic solution containing sodium chloride and di-sodium EDTA for light stabilisation and to entrain approximately 0.4% EDTA. Followed by washing in organic solvent wash containing fibre finishing agents including tween 20 and benzethonium chloride (to give 0.135% benzethonium chloride on the finished product). Warm air drying, cutting to staple and processing into a nonwoven felt by carding and a needle punching process. The dressings were cut to size from the felt and packaged in a light, moisture and vapour impermeable heat sealed foil pouch.

The dressings were removed from the packs and then subjected to various controlled environments.

Controlled Environments

Ambient as packed, tested without any preconditioning;

Zero humidity: Stored in a square desiccator with 3 perforated perspex shelves above a layer of silica gel desiccant, conditioned for a minimum of 5 days;

and the following by storing in humidity controlled rooms (Source Bioscience Ltd.) for a minimum of 6 days:

25±2° C./60±5% RH

30±2° C./65%±5RH

40±2° C./75%±5RH.

Samples (ambient as packed) were tested immediately after opening the packs. Samples removed from the other environments were sealed into plastic bags during removal, and then tested immediately. The plastic bags (also preconditioned in corresponding controlled environments) were used to maintain the humidity of the environment of the samples until the point of testing.

Loss on Drying (LOD)

LOD of the samples was determined using the Ohaus moisture balance MB23 operated in accordance with the instruction manual. A sample mass of greater than 1 gram was used. Samples were cut to fit within the weighing pan, ensuring there was adequate clearance from the heating element. A standardised method was used with a maximum temperature limit of 110° C. The endpoint was determined automatically when the sample mass stopped reducing and was stable. Under these conditions the fabric did not char. Typically, samples would be subjected to a 10 minute cycle.

Fabric Thickness (Loft)

Samples were tested using the Hampden Soft Materials Thickness Gauge, Model FMTm1-4D, S/N 14082. Fabric thickness (sometimes referred to as loft) was determined for 6 dressings per batch.

Fabric Dry Tensile Strength 2.5 cm×7.5 cm rectangular strips were cut from along the length (machine direction) and across the width (transverse direction) using a ribbon cutting die and press. Samples were conditioned as described in the table. The peak force and the extension at which that force occurred were recorded when a 50 mm test length was stretched at a constant separation rate of 100 mm per minute.

Results

Relationship between absolute and relative humidity

| | Pre-Conditioning | | | | |
|---|---|---|---|---|---|
| | Dry | Ambient | 25° C./ 60% RH | 30° C./ 65% RH | 40° C./ 75% RH |
| Moisture (g/m$^3$) | 0.00 | 9.50 | 13.81 | 19.71 | 38.29 |
| Thickness (mm) | 0.170 | 0.190 | 0.198 | 0.183 | 0.202 |
| LOD % | 9.28 | 11.93 | 14.17 | 15.27 | 18.10 |
| Tensile Machine (N/cm) | 3.10 | 5.19 | 5.80 | 5.36 | 7.75 |
| Tensile Transverse (N/cm) | 5.15 | 6.53 | 11.12 | 10.23 | 14.28 |

Loss on drying is the summation of all the volatile substances that can be removed by heating at 110° C. These include ethanol, water and to some degree acetic acid.

It is believed that water is the most critical of these to the successful production of gelling fibre products. Insufficient moisture leads to embrittlement which in turn leads to fibre breakage during fibre processing and the formation of dust. The subsequent reduced length stable fibre can then produce a weaker and lighter fabric with less loft which in turn leads to a lower absorbency product.

For this particular fibre, for this example, textile trials have shown that fibres for use in wound dressings according to the invention can be successfully textiled between 42% and 50% RH at around 18 to 20° C. Trials suggest that fibres with 10.5% to 11.5% w/w moisture content can be carded efficiently.

The results show that tensile strength, loft and LOD are all functions of equilibrium moisture content. The results suggest that fibres with a moisture content of greater than 10.5% will be able to be textiled to produce dressings suitable for use in the present invention.

Example 2

Effect of moisture content on conformability of examples of silver containing wound dressings according to the invention Materials:

Test Dressings:

AQUACEL Ag, commercial product, absorbent, gelling, fibrous-felt dressing containing 1.2% w/w ionic silver.

Lot 1G 00157 5 cm×5 cm

Lot 1H 03025 10 cm×10 cm

Lot 1E 02908 15 cm×15 cm

AQUACEL Ag treated with an antimicrobial composition comprising di-sodium EDTA and benzethonium chloride during the addition of silver to the fibres.

Lot 1H 01291B 5 cm×5 cm

Lot 1H 01302B+C 10 cm×10 cm

Lot 1H 01303D 15 cm×15 cm Lot 1H 01251C+D 20 cm×30 cm

Methods:

The samples of AQUACEL Ag according to the invention, that is those treated with an antimicrobial composition comprising di-sodium EDTA and benzethonium chloride were produced by the method of example 1.

The resulting dressings were conditioned in a laboratory environment maintained at an average temperature of 20° C.±2° C. and an average relative humidity of 65% RH±4% for at least 24 hours prior to testing. The dressings had a moisture content as shown below.

Lot 1H 01291B 5 cm×5 cm LOD 12%

Lot 1H 01302B+C 10 cm×10 cm LOD 11%

Lot 1H 01303D 15 cm×15 cm LOD 11%

Lot 1H 01251C+D 20 cm×30 cm LOD 11%

The AQUACEL Ag dressings were similarly conditioned and packaged.

Dressing conformability was assessed using a panel of three laboratory staff who were given six samples each of the dressing according to the invention and correspondingly sized AQUACEL Ag as a comparator (or control). They wrapped each dressing around their forearm (in the dry state directly from the packaging) and scored how well each dressing conformed to the shape of the arm using a comparative score based on a five point system.

(A) much better than the comparator (B) better than the comparator (C) the same as the comparator (D) worse than the comparator (E) much worse than the comparator.

The results are given in the following table.

| | Flexibility Score | | | | |
|---|---|---|---|---|---|
| Sample Details | A | B | C | D | E |
| Lot 1H 1302B | | | 6 | | |
| Lot 1H 1302C | | 1 | 5 | | |
| Lot 1H 1302D | | | 6 | | |

These results show that the dressings according to the invention were either equal to or better than the AQUACEL Ag which is known to have good conformability.

What is claimed is:

1. A process for preparing a packaged wound dressing including modified cellulosic fibres treated with an antimicrobial composition having a source of an antimicrobial metal ion and a quaternary cationic surfactant, the process comprising:

modifying cellulosic fibers to obtain carboxymethylcellulose;

neutralizing the carboxymethylcellulose with an organic acid;

adding a source of antimicrobial metal ion to the neutralized carboxymethylcellulose;

washing the neutralized carboxymethylcellulose and the added source of antimicrobial metal ion to obtain a product;

drying and processing the product into at least one nonwoven felt;

packaging the at least one nonwoven felt to provide a packaged wound dressing;

subjecting the at least one nonwoven felt to a plurality of controlled environments;

obtaining a plurality of samples from the at least one nonwoven felt subjected to the plurality of controlled environments;

measuring a tensile strength of each one of the plurality of samples in a machine direction along a length of each one of the plurality of samples, and measuring a tensile strength of each one of the plurality of samples in another direction transverse to the machine direction, wherein:

subjecting the at least one nonwoven felt to the plurality of controlled environments comprises (i) storing a first sample of the plurality of samples in an ambient environment without any preconditioning, (ii) storing a second sample of the plurality of samples in a dessicator in a zero humidity environment, and (iii) preconditioning a third sample of the plurality of samples at a temperature of at least 23° C. and at a humidity of at least 55% RH such that the third sample has a moisture content of between 10% and 20% by weight, measuring the tensile strength of each one of the plurality of samples in the machine direction comprises measuring the tensile strength of the first sample in the machine direction, measuring the tensile strength of the second sample in the machine direction, measuring the tensile strength of the third sample in the machine direction, comparing the measured tensile strength of the first sample, the second sample, and the third sample in the machine direction, and determining the measured tensile strength of the third sample in the machine direction to be greater than the measured tensile strength of each of the first sample and the second sample in the machine direction, and measuring the tensile strength of each one of the plurality of samples in the another direction transverse to the machine direction comprises measuring the tensile strength of the first sample in the another direction, measuring the tensile strength of the second sample in the another direction, measuring the tensile strength of the third sample in the another direction, comparing the measured tensile strength of the first sample, the second sample, and the third sample in the another direction, and determining the measured tensile strength of the third sample in the another direction to be greater than the measured tensile strength of each of the first sample and the second sample in the another direction.

2. The process of claim 1, wherein:

neutralizing the carboxymethylcellulose with an organic acid comprises neutralizing the carboxymethylcellulose to a pH of at least 5.0, and adding the source of antimicrobial metal ion to the neutralized carboxymethylcellulose comprises adding at least 1% by weight silver ion to the neutralized carboxymethylcellulose.

3. The process of claim 2, wherein washing the neutralized carboxymethylcellulose and the added source of antimicrobial metal ion to obtain the product comprises:

washing the neutralized carboxymethylcellulose and the added source of antimicrobial metal ion in a first wash solution containing EDTA, and washing the neutralized carboxymethylcellulose and the added source of antimicrobial metal ion in a second wash solution containing benzethonium chloride.

* * * * *